(12) United States Patent
Lee

(10) Patent No.: US 9,656,450 B2
(45) Date of Patent: May 23, 2017

(54) APPARATUS FOR LAMINATING SUBSTRATES

(75) Inventor: Yuhwen Lee, Chubei (TW)

(73) Assignee: TPK TOUCH SOLUTIONS, INC., Taipei (TW)

(*) Notice: Subject to any disclaimer, the term of this patent is extended or adjusted under 35 U.S.C. 154(b) by 1342 days.

(21) Appl. No.: 12/003,792

(22) Filed: Jan. 2, 2008

(65) Prior Publication Data

US 2009/0165957 A1 Jul. 2, 2009

(51) Int. Cl.
*B32B 37/10* (2006.01)
*B32B 37/00* (2006.01)

(52) U.S. Cl.
CPC ...... *B32B 37/1018* (2013.01); *B32B 37/0046* (2013.01)

(58) Field of Classification Search
USPC ................. 156/285–287, 381, 382
See application file for complete search history.

(56) References Cited

U.S. PATENT DOCUMENTS

| | | | |
|---|---|---|---|
| 4,290,838 A | 9/1981 | Reavill et al. | |
| 5,037,599 A * | 8/1991 | Olson | 264/510 |
| 5,090,122 A * | 2/1992 | Kitagawa | 29/852 |
| 5,292,388 A * | 3/1994 | Candore | 156/64 |
| 5,464,341 A | 11/1995 | Tachibana et al. | |
| 5,501,910 A | 3/1996 | Smith | |
| 6,106,665 A | 8/2000 | Wood et al. | |
| 6,369,316 B1 | 4/2002 | Plessing et al. | |
| 6,527,904 B1 | 3/2003 | Maruyama et al. | |
| 6,706,131 B2 | 3/2004 | Steelman et al. | |
| 6,735,866 B2 | 5/2004 | Nogueroles Vines et al. | |
| 6,755,929 B2 | 6/2004 | Sun et al. | |
| 7,052,572 B2 | 5/2006 | Miura et al. | |

(Continued)

FOREIGN PATENT DOCUMENTS

| CN | 1452546 A | 10/2003 |
|---|---|---|
| CN | 1624937 A | 6/2005 |

(Continued)

OTHER PUBLICATIONS

A Communication with translation from the Korean Patent Office dated May 22, 2009 regarding the corresponding foreign patent application KR 20-2008-0002245.

*Primary Examiner* — Christopher Schatz
(74) *Attorney, Agent, or Firm* — Cooper Legal Group, LLC

(57) ABSTRACT

An apparatus for laminating substrates includes a laminating fixture having an open-topped recessed space formed by a pair of corresponding sidewalls for holding a target substrate therein. The recessed space is communicable with an air evacuation passage. A supporting structure is formed in the recessed space for supporting two opposite ends of a flexible substrate thereon, such that a bottom of the flexible substrate is spaced from a laminating surface of the target substrate by a predetermined distance. A soft plate is disposed over the open-topped laminating fixture to form an airtight chamber in the laminating fixture. When the airtight chamber is vacuumed using a vacuum pump via the evacuation passage, the soft plate is subjected to a suction pressure and downward deformed to press the flexible substrate downward, causing the flexible substrate to deflect to attach its bottom on the laminating surface of the target substrate.

9 Claims, 13 Drawing Sheets

(56) References Cited

U.S. PATENT DOCUMENTS

| | | | |
|---|---|---|---|
| 2005/0092419 A1* | 5/2005 | Lee | G02F 1/1333 156/64 |
| 2006/0011292 A1* | 1/2006 | Lee et al. | 156/285 |
| 2006/0081332 A1* | 4/2006 | Kang et al. | 156/285 |
| 2006/0113021 A1* | 6/2006 | Ueyama et al. | 156/64 |

FOREIGN PATENT DOCUMENTS

| | | |
|---|---|---|
| CN | 1630104 A | 6/2005 |
| CN | 1735501 A | 2/2006 |
| CN | 1960606 A | 5/2007 |
| JP | 62-229250 | 10/1987 |
| JP | 62-295055 | 12/1987 |
| JP | 2006-035789 | 2/2006 |
| TV | I286626 | 9/2007 |
| TW | I278793 | 4/2007 |

* cited by examiner

APPARATUS FOR LAMINATING SUBSTRATES

FIELD OF THE INVENTION

The present invention relates to a laminating apparatus, and more particularly to an apparatus for laminating a flexible substrate to another substrate.

BACKGROUND OF THE INVENTION

The display screen and the touch screen for the currently widely available mobile phones, personal digital assistants (PDAs), and 3C products (including Computer, Communication, and Consumer electronics) with audio/visual (AV) device are made by laminating at least two different types of substrates together. FIG. 1 shows a conventional way of laminating two substrates together. As shown, a target substrate 1 has a laminating surface 11, on which a layer of optical adhesive 12 is applied. To laminate a flexible substrate 2 to the laminating surface 11 of the target substrate 1, a roller 3 is rolled in a direction I to apply a pressing force II against the flexible substrate 2, so that the flexible substrate 2 is gradually laminated to the laminating surface 11 of the target substrate 1 via the optical adhesive 12 when the roller 3 rolls. Meanwhile, air between the two substrates 1, 2 is expelled from an open end between the two substrates 1, 2.

The above-described conventional way of laminating two substrates together using a roller is disadvantageous because the roller is a mechanical device having limited cycle time for laminating only limited number of substrates together. Moreover, laminating with a roller would result in an edge effect, in which gas is trapped at a laminating interface to form bubbles that adversely affect the quality of the laminated substrates. To overcome these disadvantages, some other laminating skills have been developed. For example, U.S. Pat. No. 6,106,665 disclosed an apparatus for making ophthalmic lenses. With the apparatus, a composite lens formed from two wafers and having an optical curvature is received in an airtight enclosure formed between an upper and a lower flexible transparent sheet, and a vacuum pump draws the upper and lower flexible sheets into engagement with the composite lens to press the wafers together. Thereafter, an ultraviolet (UV) lamp is used to irradiate and cure an adhesive layer between the two wafers to form the composite lens.

And, U.S. Pat. No. 5,501,910 discloses a technique for forming a sandwiched structure comprised of a glass sheet, an adhesive layer, and a plastic film in a vacuum bag. In addition to the use of vacuum technique, a metal cover plate applying a pressing force is also used to assist in the laminating of the glass sheet to the plastic film.

The lamination disclosed in U.S. Pat. No. 6,106,665 is conducted within a ring plate, and, the lamination disclosed in U.S. Pat. No. 5,501,910 is conducted in a vacuumed bag. Neither of the above two US patents provides a stable laminating fixture. As a result, the substrates are subjected to misalignment in the process of lamination.

Moreover, the above two US patents use only the vacuum pressure and/or the pressing cover plate to assist in the lamination of two different substrates together. There is not included any other mechanism that may apply an additional external force to the substrates for the substrates to be more tightly laminated together.

It is also noted U.S. Pat. No. 6,106,665 is designed to apply in making ophthalmic lenses only, but it is not appropriate to use in the production of display screens and touch screens or the lamination of other different substrates.

SUMMARY OF THE INVENTION

A primary objective of the present invention is to provide a laminating apparatus that includes a stable laminating fixture, so that two substrates may be stably laminated together without the risk of being misaligned with each other.

Another objective of the present invention is to provide an apparatus for laminating substrates, having a push mechanism to ensure the fully tight lamination of two substrates together.

A further objective of the present invention is to provide a laminating apparatus that may be applied in various industrial fields to laminate different substrates together.

To fulfill the above objectives, an apparatus for laminating substrates is disclosed. The apparatus includes a laminating fixture having an open-topped recessed space formed by a pair of corresponding sidewalls for holding a target substrate therein, and the recessed space being communicable with an air evacuation passage. A supporting structure is formed in the recessed space for supporting two opposite ends of a flexible substrate thereon, such that a bottom of the flexible substrate is spaced from a laminating surface of the target substrate by a predetermined distance. A soft plate is disposed over the open-topped laminating fixture to form an airtight chamber in the laminating fixture. When the airtight chamber is vacuumed using a vacuum pump via the evacuation passage, the soft plate is subjected to a suction pressure and downward deformed to press the flexible substrate downward, causing the flexible substrate to deflect to attach its bottom on the laminating surface of the target substrate.

With the technical means of the present invention, two different substrates may be stably laminated together without the risk of misaligning with each other. The push mechanism enables the two substrates to be more tightly laminated together. Moreover, the substrate laminating apparatus according to the present invention may be applied in various industrial fields.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

Figure 1:
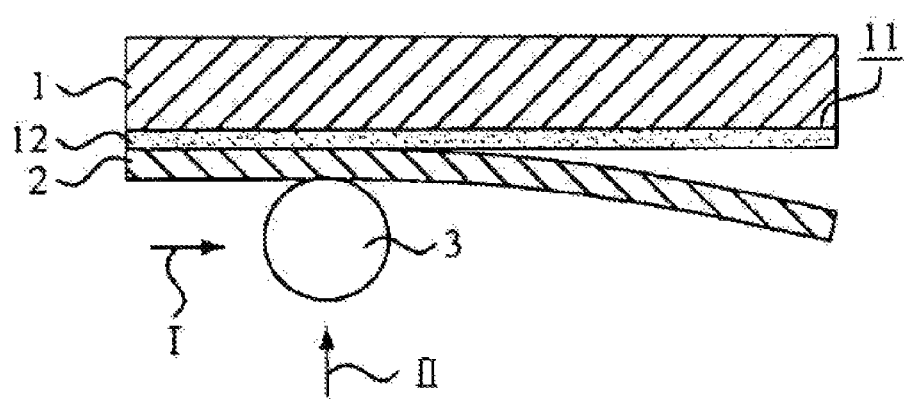
FIG. 1 shows a conventional way of laminating two substrates together using a press roller.
Figure 2:
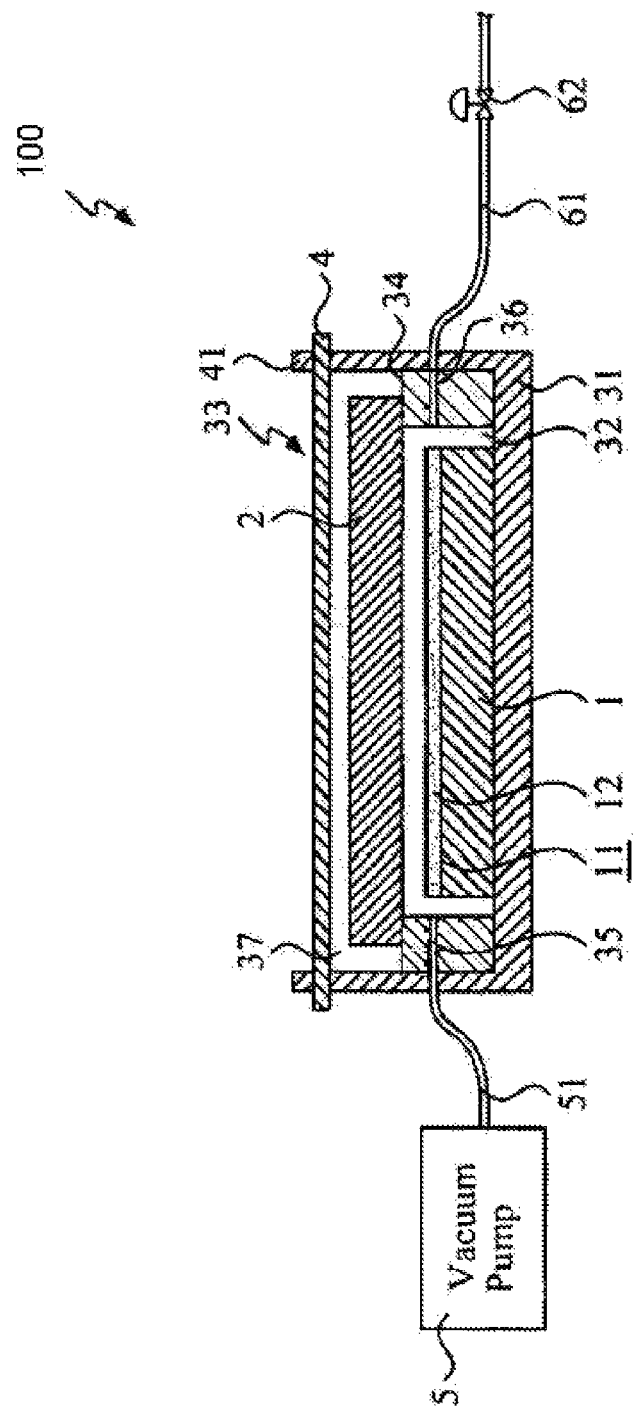
FIG. 2 is a vertical sectional view of an apparatus for laminating substrates according to a first embodiment of the present invention.

Please refer to FIG. 2 that is a sectional view of an apparatus for laminating substrates 100 according to a first embodiment of the present invention. As shown, the apparatus 100 is used to laminate a flexible substrate 2 to a laminating surface 11 of a target substrate 1. The target substrate 1 has a layer of optical adhesive 12 applied over the laminating surface 11 thereof, and the flexible substrate 2 is laminated to the laminating surface 11 of the target substrate 1 by the optical adhesive 12.

The laminating apparatus 100 according to the first embodiment of the present invention includes a laminating fixture 31, a soft plate 4, and a hold-down member 41.

The laminating fixture 31 includes a pair of corresponding sidewalls that together define a recessed space 32 having an open top 33. The above-mentioned target substrate 1 is disposed in the recessed space 32 with the laminating surface 11 facing upward. The recessed space 32 is internally provided with a supporting structure 34, on which two opposite ends of the above-mentioned flexible substrate 2 are supported, such that a bottom of the flexible substrate 2 is spaced from the laminating surface 11 of the target substrate 1 by a predetermined distance. In the first embodiment, the supporting structure 34 is a stepped configuration in the recessed space 32 at the corresponding sidewalls of the laminating fixture 31. The recessed space 32 is communicable with an air evacuation passage 35, and the laminating fixture 31 is provided at a predetermined position with an air exhaust opening 36.

The soft plate 4 is disposed over the open top 33 of the laminating fixture 31, so that an airtight chamber 37 is formed between the soft plate 4 and the recessed space 32 of the laminating fixture 31. Alternatively, the soft plate 4 may be replaced with a flexible plate. The hold-down member 41 is located at the open top 33 of the laminating fixture 31 for holding the soft plate 4 to the open top 33, so that the soft plate 4 is tightly closed onto the open top 33. The soft plate 4 is spaced from a top of the flexible substrate 2 by a predetermined distance. The soft plate 4 may be made of a soft or elastic material, such as rubber, silicon rubber, polyvinyl chloride (PVC), polyethylene terephthalate (PET), polyethylene (PE), etc.

Figure 3:
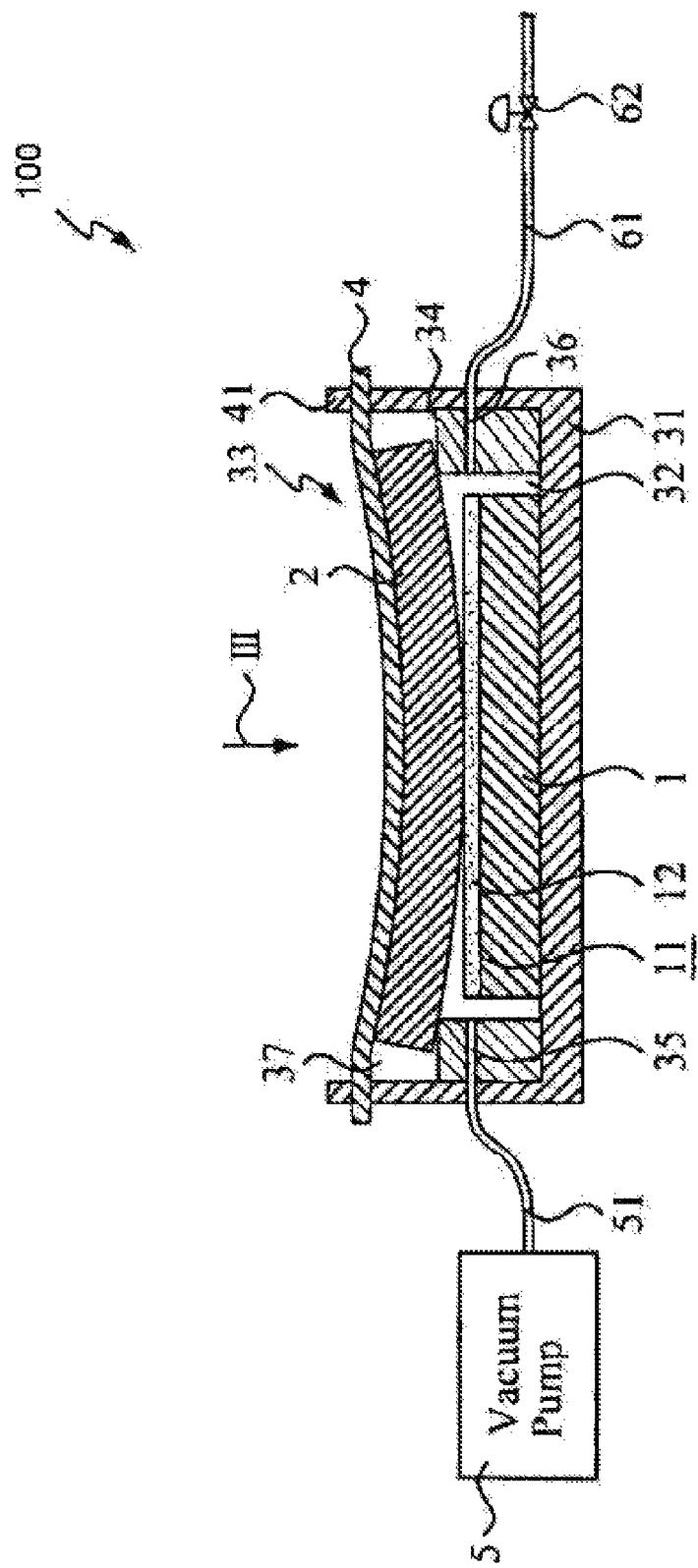
FIG. 3 shows the operation of the apparatus of FIG. 2 to laminate two substrates together.

Please refer to FIG. 3. When the airtight chamber 37 formed between the soft plate 4 and the recessed space 32 of the laminating fixture 31 is vacuumed using a vacuum pump 5 via a tube 51 and the evacuation passage 35, the soft plate 4 is subjected to a suction pressure III and downward deformed to thereby press the flexible substrate 2 downward, causing the flexible substrate 2 to deflect downward to attach its bottom on the laminating surface 11 of the target substrate 1 via the optical adhesive 12. At this point, a switch valve 62 connected to the air exhaust opening 36 via a duct 61 is turned open, so that any air remained in the chamber 37 is exhausted via the air exhaust opening 36 and the duct 61.

Figure 4:
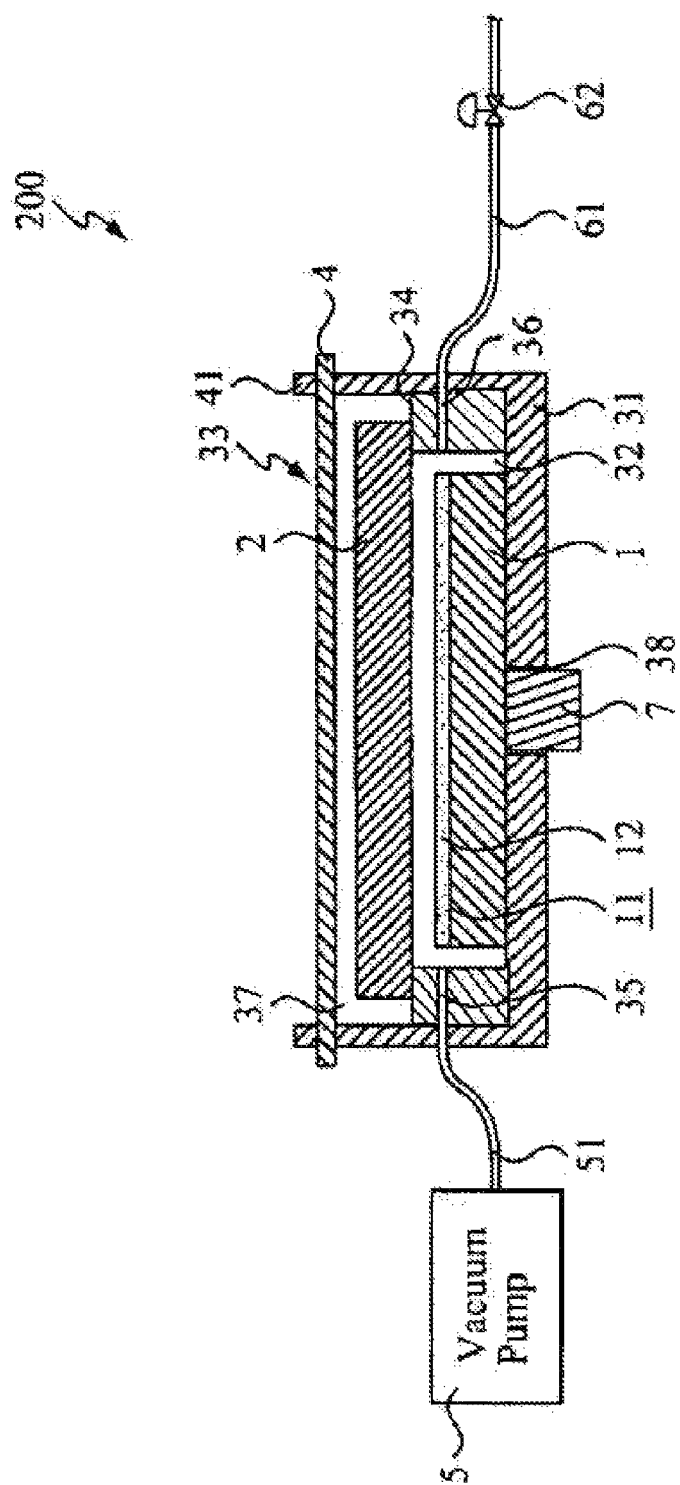
FIG. 4 is a vertical sectional view of an apparatus for laminating substrates according to a second embodiment of the present invention.

FIG. 4 is a vertical sectional view of an apparatus for laminating substrates 200 according to a second embodiment of the present invention. Since the apparatus 200 in the second embodiment is generally structurally similar to the apparatus 100 in the first embodiment, like elements in the two embodiments are denoted by the same reference numeral. The second embodiment is different from the first embodiment in that the apparatus 200 further includes a push mechanism 7 located in a slot 38 formed at a bottom of the laminating fixture 31.

Figure 5:
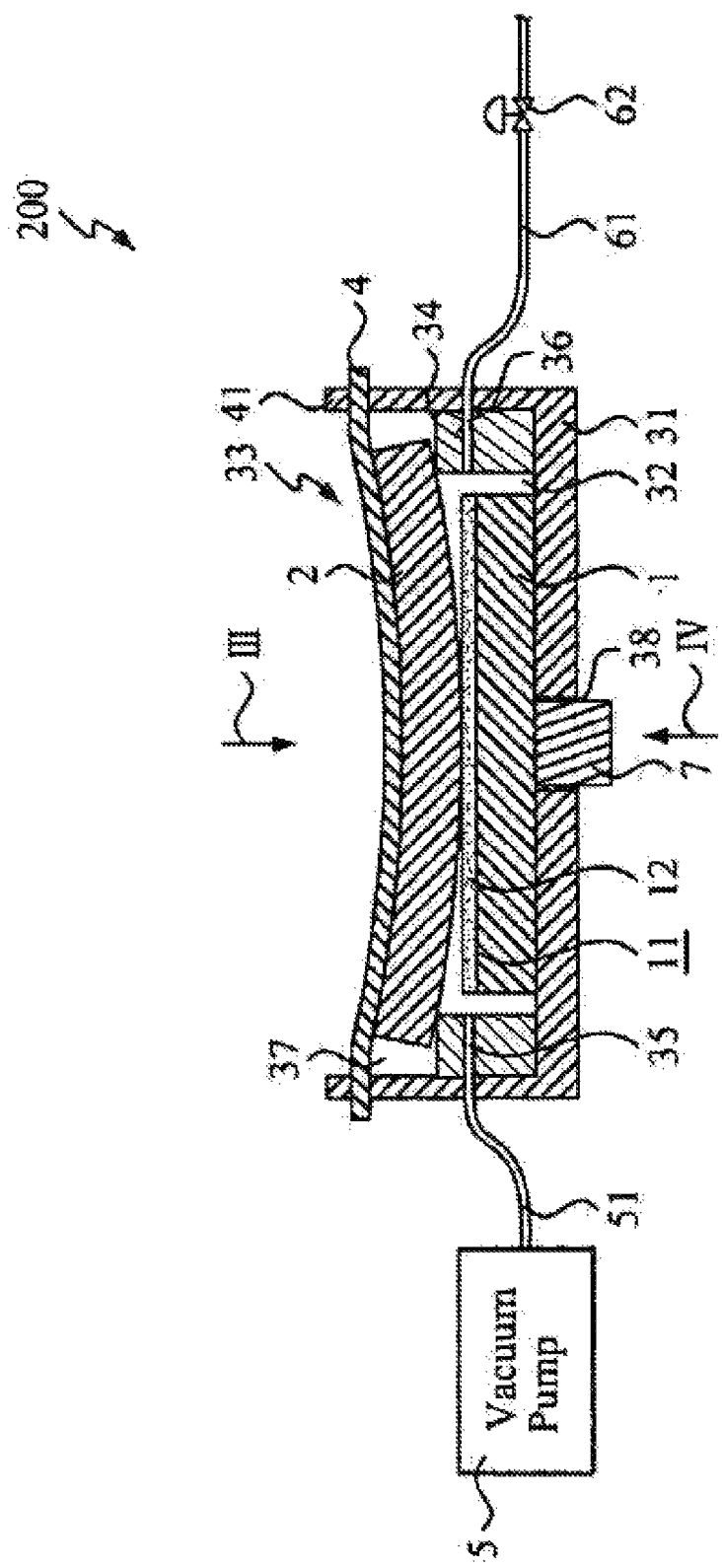
FIG. 5 shows the operation of the apparatus of FIG. 4 to laminate two substrates together.

Please refer to FIG. 5. In the apparatus 200, when the air in the airtight chamber 37 is evacuated, the push mechanism 7 is actuated to apply an upward pushing force along a direction IV against the target substrate 1, so that the target substrate 1 is upward pushed by a predetermined distance to fully attach its laminating surface 11 against the bottom of the flexible substrate 2. Similarly, the switch valve 62 may be opened at this point, so that any air remained in the airtight chamber 37 is exhausted via the exhaust opening 36 and the duct 61.

Figure 6:
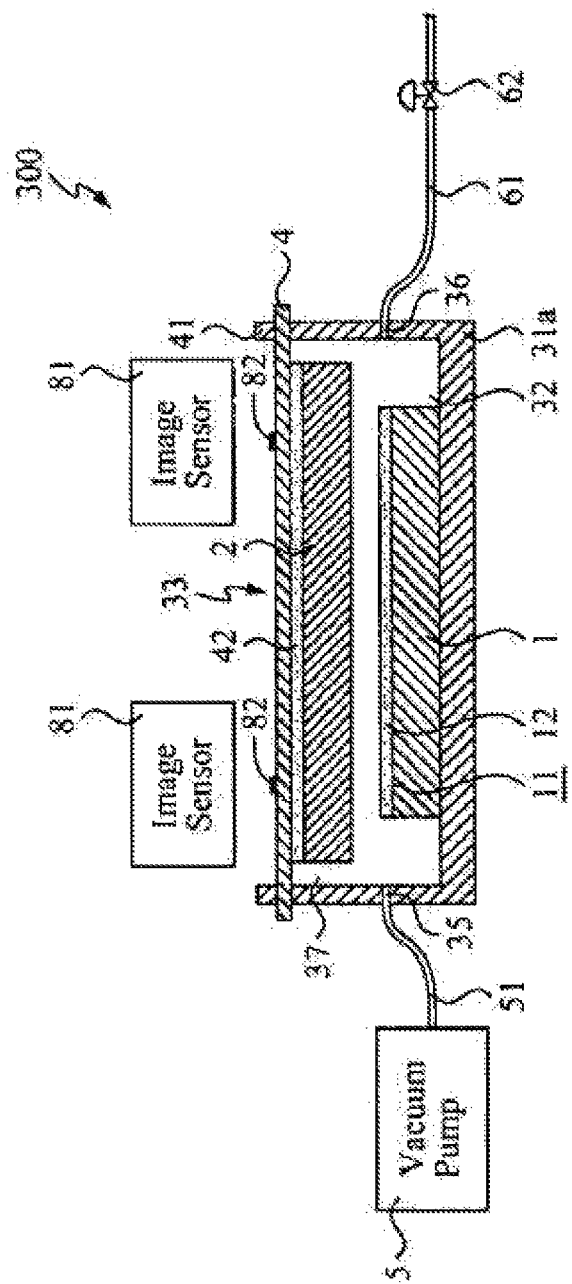
FIG. 6 is a vertical sectional view of a apparatus for laminating substrates according to a third embodiment of the present invention.

FIG. 6 is a sectional view of an apparatus for laminating substrates 300 according to a third embodiment of the present invention. Since the apparatus 300 in the third embodiment is generally structurally similar to the apparatus 100 in the first embodiment, like elements in the two embodiments are denoted by the same reference numeral. The third embodiment is different from the first embodiment in that the apparatus 300 has a laminating fixture 31a that does not have a stepped supporting structure at the corresponding sidewalls thereof, and the flexible substrate 2 is attached to the bottom of the soft plate 4 by a layer of static adhesive 42; and that the apparatus 300 uses two CCD (Charge-Coupled Device) image sensors 81 and a pair of locating points 82 provided on a top of the soft plate 4 to determine the relative position and the alignment of the target substrate 1 with the flexible substrate 2.

Figure 7:
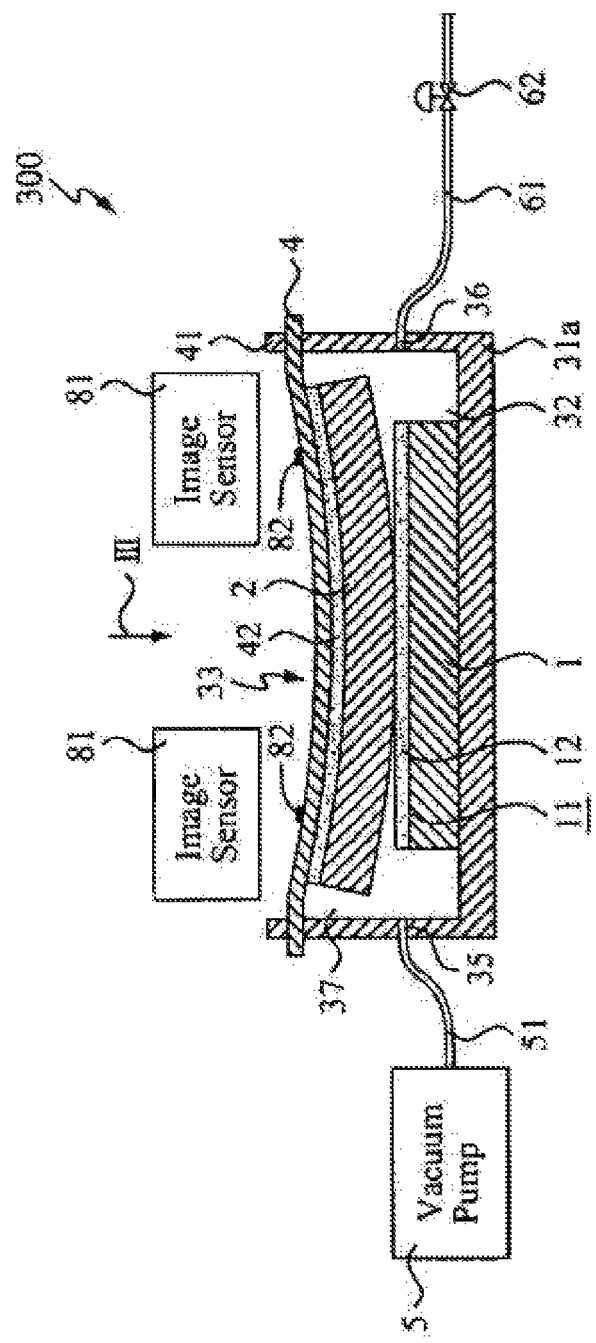
FIG. 7 shows the operation of the substrate laminating apparatus of FIG. 6 to laminate two substrates together.

Please refer to FIG. 7. In the apparatus 300, when the airtight chamber 37 is vacuumed using the vacuum pump 5 via the vacuum tube 51 and the evacuation passage 35, the soft plate 4 and the flexible substrate 2 attached thereto are subjected to a suction pressure along a direction III and downward deformed, and the flexible substrate 2 is caused to deflect to attach its bottom on the laminating surface 11 of the target substrate 1. At this point, the switch valve 62 is turned open, so that any air remained in the chamber 37 is exhausted via the air exhaust opening 36 and the duct 61.

Figure 8:
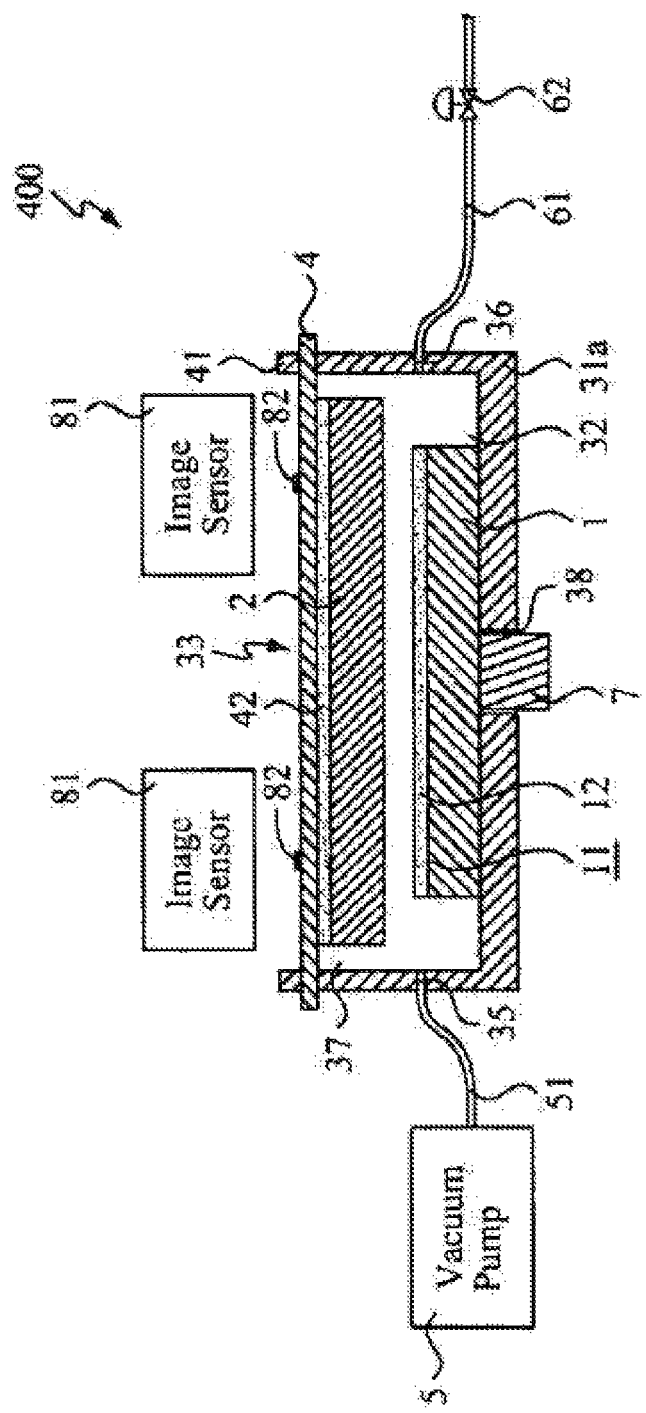
FIG. 8 is a vertical sectional view of an apparatus for laminating substrates according to a fourth embodiment of the present invention.

FIG. 8 is a vertical sectional view of an apparatus for laminating substrates 400 according to a fourth embodiment of the present invention. Since the apparatus 400 in the fourth embodiment is generally structurally similar to the apparatus 300 in the third embodiment, like elements in the two embodiments are denoted by the same reference numeral. The fourth embodiment is different from the third embodiment in that the apparatus 400 further includes a push mechanism 7 located in a slot 38 formed at a bottom of the laminating fixture 31a.

Figure 9:
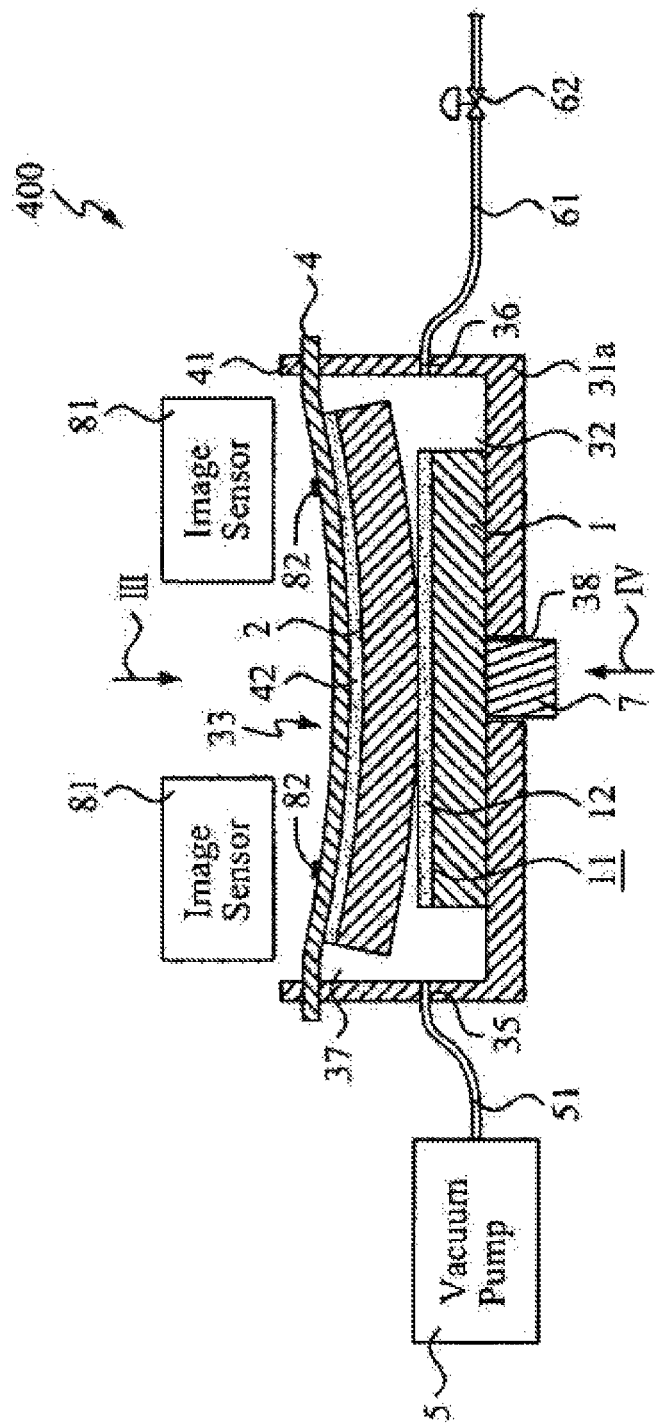
FIG. 9 shows the operation of the apparatus of FIG. 8 to laminate two substrates together.

Please refer to FIG. 9. In the apparatus 400, when the air in the airtight chamber 37 is evacuated, the push mechanism 7 is actuated to apply an upward pushing force IV against the target substrate 1, so that the target substrate 1 is upward pushed by a predetermined distance to fully attach its laminating surface 11 against the bottom of the flexible substrate 2. Similarly, the switch valve 62 may be opened at this point, so that any air remained in the airtight chamber 37 is exhausted via the exhaust opening 36 and the duct 61.

Figure 10:
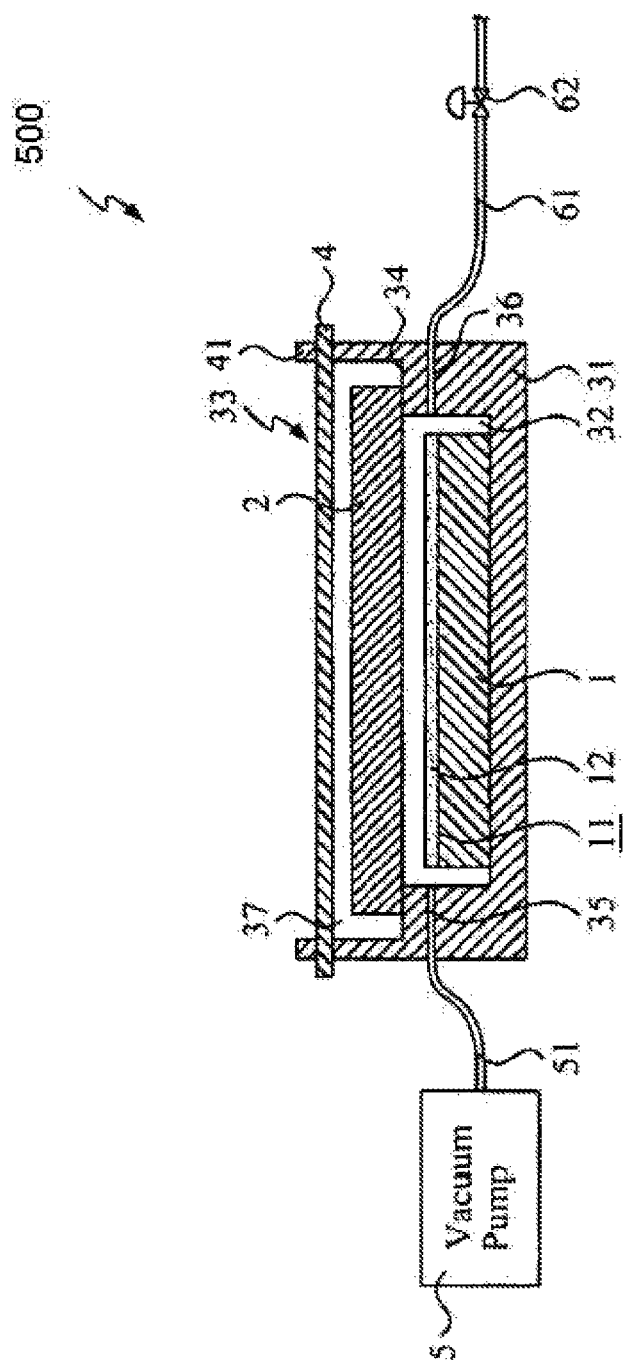
FIG. 10 is a vertical sectional view of an apparatus for laminating substrates according to a fifth embodiment of the present invention.

Please refer to FIG. 10 which is a sectional view of an apparatus for laminating substrates 100 according to a fifth embodiment of the present invention. As shown, the apparatus 100 is used to laminate a flexible substrate 2 to a laminating surface 11 of a target substrate 1. The target substrate 1 has a layer of optical adhesive 12 applied over the laminating surface 11 thereof, and the flexible substrate 2 is laminated to the laminating surface 11 of the target substrate 1 by the optical adhesive 12.

The laminating apparatus 500 according to the fifth embodiment of the present invention includes a laminating fixture 31b, a soft plate 4, and a hold-down member 41.

The laminating fixture 31b includes a pair of corresponding sidewalls having a first portion with a first thickness and a second portion with a second thickness which together define a recessed space 32 having an open top 33. The second thickness is less than the first thickness. The above-mentioned target substrate 1 is disposed in the recessed space 32 with the laminating surface 11 facing upward. A supporting structure 34 is formed by the first portion of the sidewalls and the second portion of the side walls of the laminating fixture 31b, on which two opposite ends of the above-mentioned flexible substrate 2 are supported, such that a bottom of the flexible substrate 2 is spaced from the laminating surface 11 of the target substrate 1 by a predetermined distance. In the fifth embodiment, the supporting structure 34 is a stepped configuration formed by the first portion with a first thickness and the second portion with a second thickness of the corresponding sidewalls of the laminating fixture 31b. The recessed space 32 is communicable with an air evacuation passage 35, and the laminating fixture 31b is provided at a predetermined position with an air exhaust opening 36.

The soft plate 4 is disposed over the open top 33 of the laminating fixture 31b, so that an airtight chamber 37 is formed between the soft plate 4 and the recessed space 32 of the laminating fixture 31b. Alternatively, the soft plate 4 may be replaced with a flexible plate. The hold-down member 41 is located at the open top 33 of the laminating fixture 31 for holding the soft plate 4 to the open top 33, so that the soft plate 4 is tightly closed onto the open top 33. The soft plate 4 is spaced from a top of the flexible substrate 2 by a predetermined distance. The soft plate 4 may be made of a soft or elastic material, such as rubber, silicon rubber, polyvinyl chloride (PVC), polyethylene terephthalate (PET), polyethylene (PE), etc.

Figure 11:
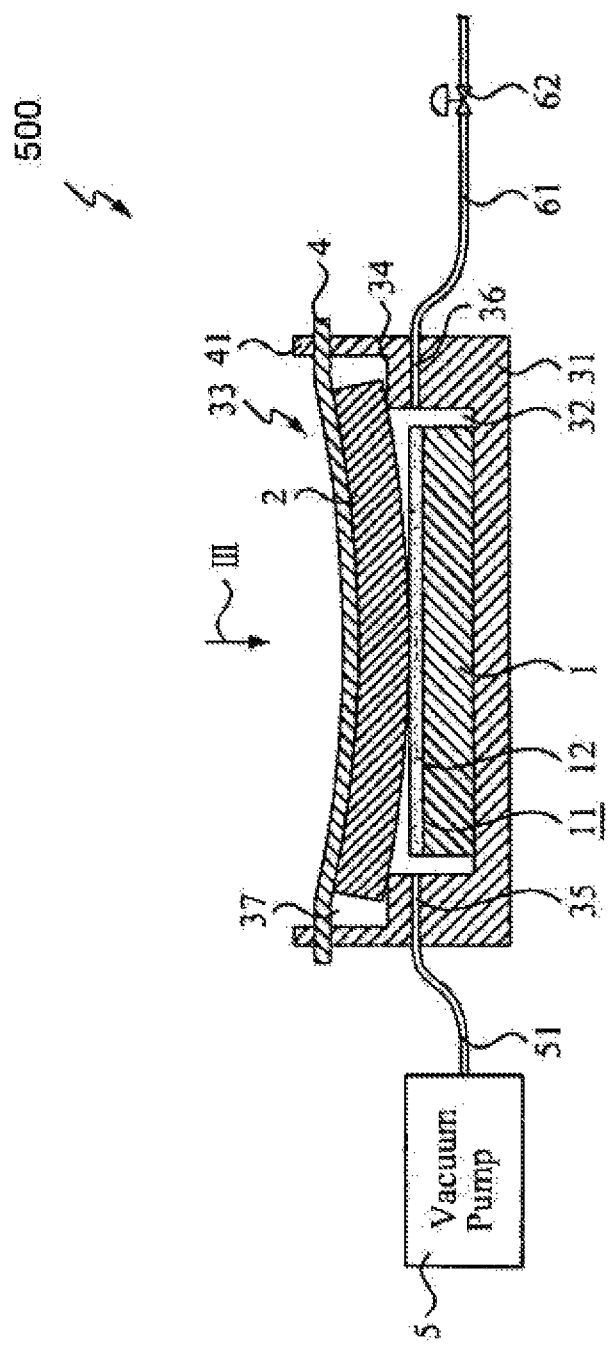
FIG. 11 shows the operation of the apparatus of FIG. 10 to laminate two substrates together.

Referring to FIG. 11, when the airtight chamber 37 formed between the soft plate 4 and the recessed space 32 of the laminating fixture 31 is vacuumed using a vacuum pump 5 via a tube 51 and the evacuation passage 35, the soft plate 4 is subjected to a suction pressure III and is downward deformed to thereby press the flexible substrate 2 downward, causing the flexible substrate 2 to deflect downward to attach its bottom on the laminating surface 11 of the target substrate 1 via the optical adhesive 12. At this point, a switch valve 62 connected to the air exhaust opening 36 via a duct 61 is turned open, so that any air remained in the chamber 37 is exhausted via the air exhaust opening 36 and the duct 61.

Figure 12:
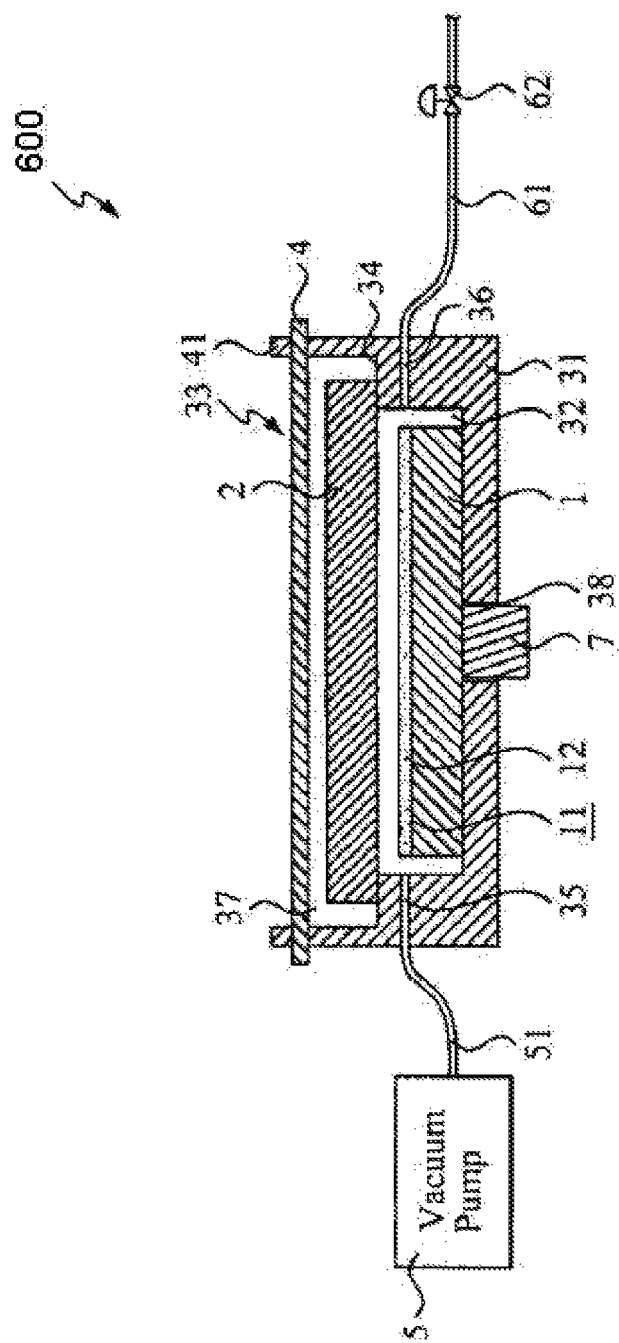
FIG. 12 is a vertical sectional view of an apparatus for laminating substrates according to a sixth embodiment of the present invention.

FIG. 12 is a vertical sectional view of an apparatus for laminating substrates 600 according to a sixth embodiment of the present invention. Since the apparatus 600 in the sixth embodiment is generally structurally similar to the apparatus 500 in the fifth embodiment, like elements in the two embodiments are denoted by the same reference numeral. The second embodiment is different from the first embodiment in that the apparatus 600 further includes a push mechanism 7 located in a slot 38 formed at a bottom of the laminating fixture 31.

Figure 13:
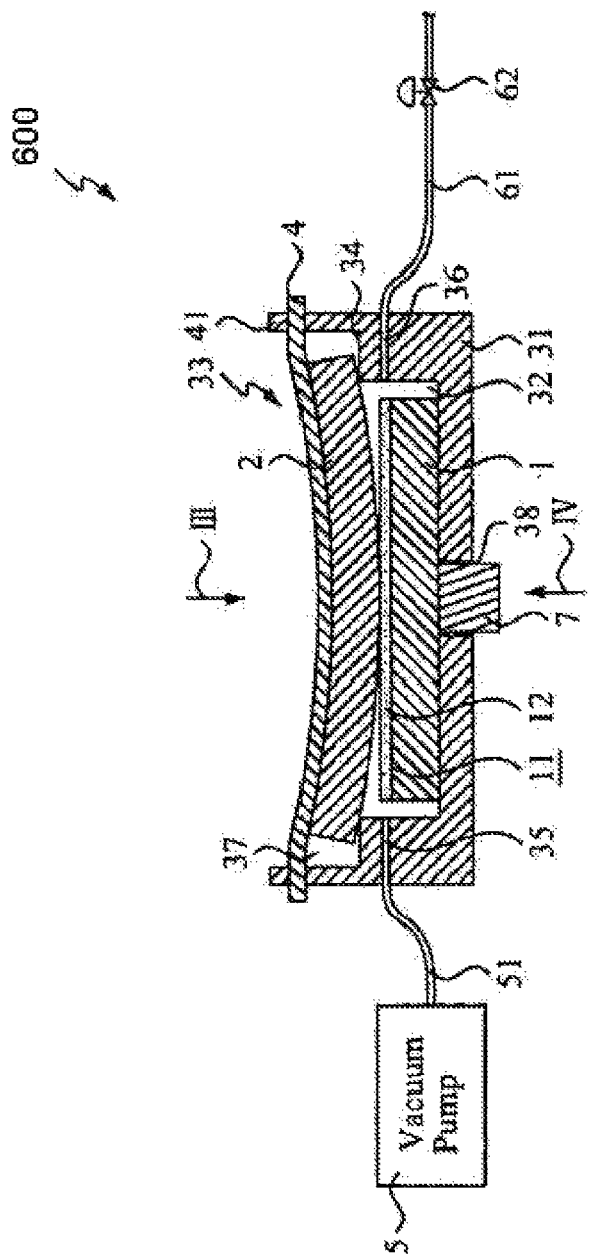
FIG. 13 shows the operation of the apparatus of FIG. 12 to laminate two substrates together.

Referring to FIG. 13, in the apparatus 600, when the air in the airtight chamber 37 is evacuated, the push mechanism 7 is actuated to apply an upward pushing force along a direction IV against the target substrate 1, so that the target substrate 1 is pushed upward by a predetermined distance to fully attach its laminating surface 11 against the bottom of the flexible substrate 2. Similarly, the switch valve 62 may be opened at this point, so that any air remained in the airtight chamber 37 is exhausted via the exhaust opening 36 and the duct 61.

Although the present invention has been described with reference to the preferred embodiments thereof and the best modes for carrying out the invention, it is apparent to those skilled in the art that a variety of modifications and changes may be made without departing from the scope of the present invention which is intended to be defined by the appended claims.

What is claimed is:

1. An apparatus for laminating a flexible substrate to a target substrate, comprising:
    a laminating fixture having a pair of sidewalls and a bottom that together define a recessed space having an open top, wherein:
        the bottom of the laminating fixture supports the target substrate,
        the pair of sidewalls has a supporting surface for supporting the flexible substrate,
        a surface of the bottom of the laminating fixture upon which the target substrate is supported lies in a first plane and the supporting surface of the pair of sidewalls upon which the flexible substrate is supported lies in a second plane parallel to the first plane, and
        the bottom of the laminating fixture is spaced apart from the supporting surface to define a first gap between a top surface of the target substrate and a bottom surface of the flexible substrate upon the target substrate and the flexible substrate being inserted into the recessed space;
    a first air evacuation tube connected to a vacuum pump and extending through a first sidewall of the pair of sidewalls to expose the first air evacuation tube to the recessed space;
    a duct exposed to the recessed space through an air exhaust opening and a switch valve connected to the duct;
    a soft plate disposed over the supporting surface and spaced apart from the supporting surface to define a second gap between a top surface of the flexible substrate and a bottom surface of the soft plate upon the flexible substrate being inserted into the recessed space, wherein:
        the soft plate is in contact with a first portion of the first sidewall extending above the supporting surface and a first portion of a second sidewall of the pair of sidewalls extending above the supporting surface,
        the soft plate and the laminating fixture together form an airtight chamber, and
        a material of the soft plate is selected to be pliable upon a suction pressure being applied to the airtight chamber via the vacuum pump to subject the soft plate to a downward deformation, the downward deformation pressing the flexible substrate toward the target substrate;

and a hold-down member for securing the soft plate to the first sidewall of the laminating fixture; and a push mechanism disposed in a slot formed on the bottom of the laminating fixture and having a top surface directly contacting the target substrate upon the target substrate being inserted into the recessed space, wherein the push mechanism is actuated when the airtight chamber is vacuumed to push the target substrate upward by a predetermined distance to cause a laminating surface of the target substrate to fully attach to a bottom surface of the flexible substrate wherein before the actuation occurs, the top surface of the push mechanism is flush with the bottom surface of the laminating fixture.

2. An apparatus for laminating a flexible substrate to a target substrate, comprising:

a laminating fixture having a bottom and a pair of sidewalls each having a first portion with a first thickness and a second portion with a second thickness different than the first thickness, wherein:

the bottom of the laminating fixture and the pair of sidewalls together defining a recessed space having an open top, the bottom of the laminating fixture supports the target substrate, the pair of sidewalls has a supporting surface for supporting the flexible substrate, a surface of the bottom of the laminating fixture upon which the target substrate is supported lies in a first plane and the supporting surface of the pair of sidewalls upon which the flexible substrate is supported lies in a second plane parallel to the first plane, and the supporting surface is disposed at an interface between the first portion and the second portion;

a first air evacuation tube exposed to the recessed space and connected to a vacuum pump;

a duct exposed to the recessed space through an air exhaust opening and a switch valve connected to the duct;

a soft plate disposed over the supporting surface, wherein:

the soft plate and the laminating fixture together form an airtight chamber, and a material of the soft plate is selected to be pliable upon a suction pressure being applied to the airtight chamber via the vacuum pump to subject the soft plate to a downward deformation, the downward deformation pressing the flexible substrate toward the target substrate;

and a hold-down member for securing the soft plate to a first sidewall of the laminating fixture; and a push mechanism disposed in a slot formed on the bottom of the laminating fixture and having a to surface directly contacting the target substrate upon the target substrate being inserted into the recessed space, wherein the push mechanism is actuated when the airtight chamber is vacuumed to push the target substrate upward by a predetermined distance to cause a laminating surface of the target substrate to fully attach to a bottom surface of the flexible substrate wherein before the actuation occurs, the to surface of the push mechanism is flush with the bottom surface of the laminating fixture.

3. The apparatus as claimed in claim 1, wherein the material of the soft plate is selected from the group consisting of rubber, silicon rubber, polyvinylchloride, and polyethylene.

4. The apparatus as claimed in claim 2, wherein the material of the soft plate is selected from the group consisting of rubber, silicon rubber, polyvinylchloride, and polyethylene.

5. The apparatus as claimed in claim 1, wherein the bottom of the laminating fixture is spaced apart from the supporting surface to maintain the first gap between a portion of the flexible substrate proximate to the supporting surface and the top surface of the target substrate when the suction pressure is applied to the airtight chamber.

6. The apparatus as claimed in claim 1, wherein the supporting surface is configured to contact a bottom surface of the flexible substrate upon the target substrate and the flexible substrate being inserted into the recessed space.

7. The apparatus as claimed in claim 2, wherein the bottom of the laminating fixture is spaced apart from the supporting surface to maintain a gap between a portion of the flexible substrate proximate to the supporting surface and a top surface of the target substrate when the suction pressure is applied to the airtight chamber.

8. The apparatus as claimed in claim 2, wherein the supporting surface is configured to contact a bottom surface of the flexible substrate upon the target substrate and the flexible substrate being inserted into the recessed space.

9. The apparatus as claimed in claim 2, wherein the first portion of the first sidewall lies in a third plane and the second portion of the first sidewall lies in a fourth plane parallel to the third plane.

\* \* \* \* \*